US006009268A

United States Patent [19]
Reis et al.

[11] Patent Number: 6,009,268
[45] Date of Patent: Dec. 28, 1999

[54] DEVICE FOR PROGRAMMING A STORED PROGRAM CONTROLLER

[75] Inventors: Stefan Reis, Erlenbach; Gerhard Wolff, Michelstadt, both of Germany

[73] Assignee: Robert Bosch GmbH, Stuttgart, Germany

[21] Appl. No.: 09/026,730

[22] Filed: Feb. 20, 1998

[30] Foreign Application Priority Data

Feb. 22, 1997 [DE] Germany .......................... 197 07 107

[51] Int. Cl.⁶ .................................................. G06F 9/445
[52] U.S. Cl. ............................................................ 395/701
[58] Field of Search ............................... 395/701, 500.43

[56] References Cited

U.S. PATENT DOCUMENTS

| | | | |
|---|---|---|---|
| 4,628,158 | 12/1986 | Rubin ......................................... | 379/10 |
| 4,663,704 | 5/1987 | Jones et al. .............................. | 364/188 |
| 4,710,863 | 12/1987 | Kaufmann et al. ...................... | 364/146 |
| 4,926,308 | 5/1990 | Giles et al. .............................. | 364/147 |
| 4,937,777 | 6/1990 | Flood et al. .............................. | 710/107 |
| 5,034,899 | 7/1991 | Schult ...................................... | 395/141 |
| 5,151,984 | 9/1992 | Newman et al. .................. | 395/500.43 |
| 5,162,986 | 11/1992 | Graber et al. ............................ | 364/146 |
| 5,193,189 | 3/1993 | Flood et al. .............................. | 709/103 |
| 5,613,115 | 3/1997 | Gihl et al. ................................ | 395/701 |
| 5,864,479 | 3/1997 | Hallwirth ............................ | 364/140.06 |

OTHER PUBLICATIONS

Title: : Design and implementation of a table driven compiler system, Author: Liu et al, URN: mcstrl.mit—lcs/MIT/LCS/TR–42, date: Jul., 1967.

Title: Using a personal computer as a real time multitasking controller, Author: Muth, Eginhard J, Source: Computer & Industrial Engineering v 11 n 1–4 1986 pp. 557–561.

*Primary Examiner*—Tariq R. Hafiz
*Assistant Examiner*—Chameli C. Das
*Attorney, Agent, or Firm*—Kenyon & Kenyon

[57] ABSTRACT

A device for programming a stored program controller includes an operating system for executing an application program, a first memory for storage of the application program, an input device for input of program instructions in a controller application-related programming language or a high-level language, and a conversion device to convert the program instructions input in the controller application-related programming language into application program instructions that can be executed directly by the operating system. A program generation device for processing the program instructions input in the high-level language includes a second memory for storing program sequences which are assigned to special program instructions included in the high-level language and implement controller-specific commands in the special program instruction, and an automatic programming section which interprets the program instructions input in the high-level language and converts them into application program instructions that can be directly executed in the operating system with the use of program sequences stored in the second memory.

8 Claims, 2 Drawing Sheets

Timer       : 0094
  - - - - - - - - - - - - - - - -
       ⋮
  if( B_E(1,BIT_0) == 0 )
  { B_A(0,BIT_0) = 0;
    B_A(0,BIT_1) = 0;
  }   ⋮
```

FIG. 3

DEVICE FOR PROGRAMMING A STORED PROGRAM CONTROLLER

FIELD OF THE INVENTION

The present invention relates to a device for programming a stored program controller which can be used, in particular, for inputting parts of a program in a high level language.

BACKGROUND OF THE INVENTION

Stored program controllers (S.C.) are programmed using programming devices and/or programming units, as they are described, e.g., in the series "Bibliothek der Technik, No. 4, Speicherprogrammierbare Steuerungen, 1987" (Library of Technology, No. 4, Stored Program Controllers, 1987). The programming instructions are input in an S.C.-related format specific to the application. Common formats include the instruction list, the contact plan, the logic plan, the function plan or the procedure language. Common among all S.C. application-related languages is that the individual programming instructions are input in the sequence in which they are subsequently processed in the CPU. To transfer a program that is input in an S.C. application-related programming language to a program that can be directly executed by the CPU, it must therefore be converted into an application program by sentence-by-sentence translation of machine language. The programming is carried out in program modules which contain one or more technologically or functionally related program instructions. A complete S.C. program is generally composed of several program modules, the individual modules being input in different S.C. application-related languages. Usually, the sequence of an S.C. program can be displayed on a screen and modified if necessary, for example, by removing program modules or adding new ones.

The suggestion of programming a numerically controlled machine in a high-level language not designed for this application is known from European Pat. No. 254 352. In this case, the program input by an operator will be interpreted in an automatic program section (compiler), checked for errors, and if appropriate, converted into an executable program. In this process, the creation of an executable program can be difficult and time-consuming, depending on the task and the programming skill of the operator. Frequently, the structure of the machine to be programmed leads to machine-specific problems that can only be solved with the high-level language used.

SUMMARY OF THE INVENTION

An object of the present invention is to provide a programming device for stored program controllers that makes it possible for a user, if necessary, to input parts of a program in a high-level language without problems.

The device according to the present invention permits program creation with any desired sequence of modules programmed in an S.C.-related language and of modules programmed in a high-level language. In this process, the operator need not leave the familiar S.C. programming environment. To transfer program modules input in a high-level language into application programs that can be executed directly in the operating system of the S.C., standard commercial compilers can be used. It is effective if the programming device includes a display device, on which the sequence of a program can be visually represented. In the representation of program sequences that are based on a program module input in a high-level language, the display processing device advantageously uses information that the compiler generates in the conversion of the program module into an executable application program.

BRIEF DESCRIPTION OF THE DRAWINGS

FIG. 2 shows an exemplary screen set-up during the start-up of a program module input in an S.C.-related language.

FIG. 3 shows an exemplary screen set-up during the start-up of a module input in a high-level language.

DETAILED DESCRIPTION

Figure 1:
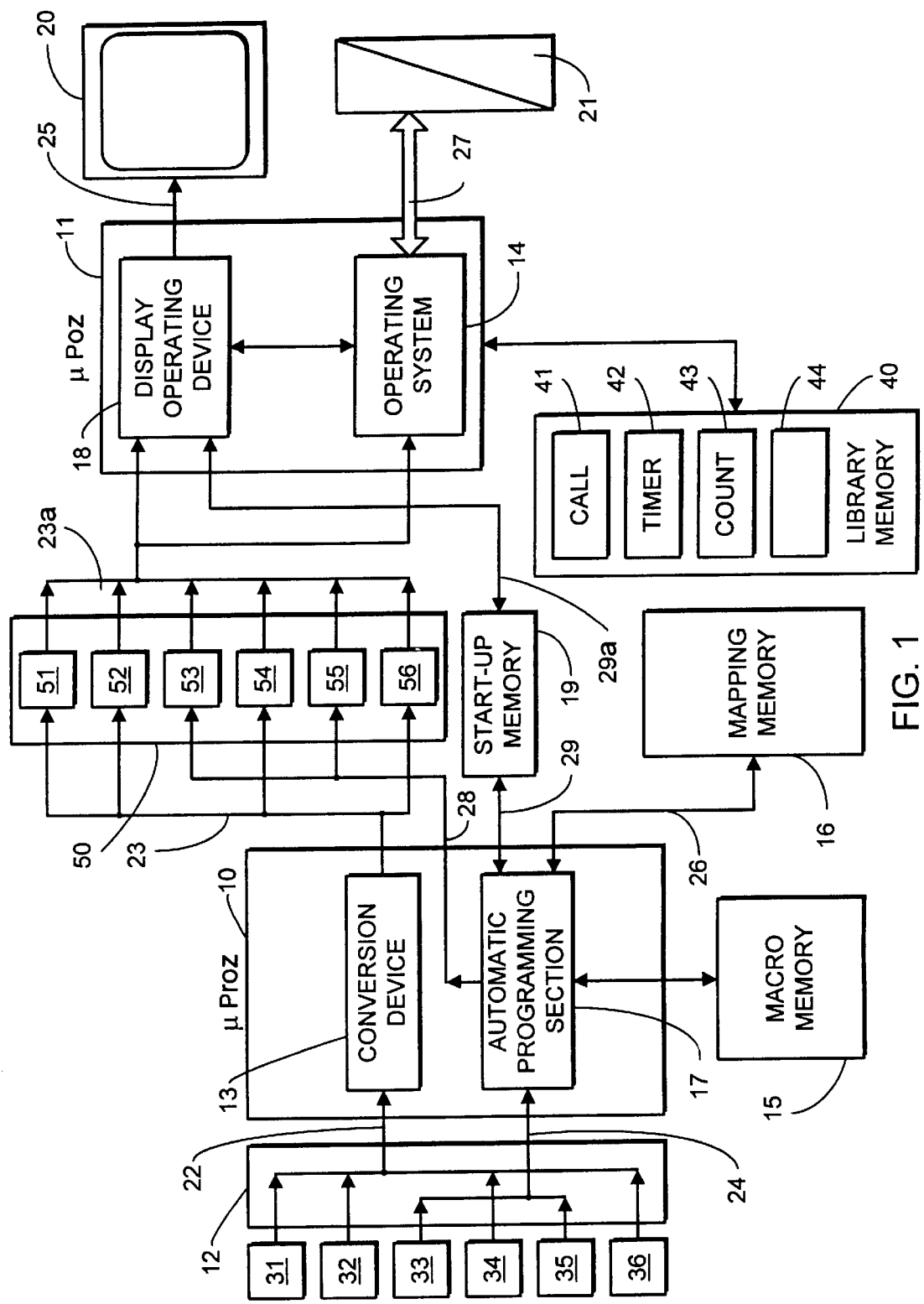
FIG. 1 shows a block diagram of an exemplary programming device according to the present invention.

In FIG. 1, the reference code 12 indicates an input device for input of a program by an operator. Usually it is designed as an alphanumeric keyboard; in addition, other input techniques are possible, e.g., input by speech. From input device 12, a first data line 22 leads to a conversion device 13, and a second data line 24 leads to an automatic program section 17 referred to in the following as a (high-level language) compiler. As indicated in FIG. 1, both data lines 22, 24 are effectively implemented as individual buses or as a common bus. The functions of conversion device 13 and compiler 17 can be implemented as operating programs that run on a common microprocessor 10. Conversion device 13 has a memory 50 connected to it downstream via an additional data line 23, effectively designed as a bus. The output of memory 50 is connected via a data line 23a to a display processing device 18 and to an S.C. operating system 14.

Compiler 17 is also connected to memory 50 via a data line 28. In addition, the compiler is connected via a data line 29 to a start-up memory 19, and also via a data line 26 to a memory 16 which serves as a directory for a library memory 40. The start-up memory 19 is connected on its output side via a data line 29a to a display processing device 18, which has a screen 20 connected to it downstream via a data connection 25. The data line 23a also connects memory 50 to the S.C. operating system 14. It is used to execute an application program stored in memory 15 and is connected on its output side via a data bus 27 with an input/output interface 21 to a process to be controlled. In addition, the S.C. operating system 14 is connected via data lines to library memory 40 and to display processing device 18. S.C. operating system 14 and display processing device 18 are, as shown in FIG. 1, each effectively implemented as operating programs running on a single microprocessor 11. Also connected to the display processing device 18 via data line 29a is start-up memory 19. The display processing device 18 is also connected via a data line 25 to a screen 20.

In the following, the function of the device described above will be explained. An S.C. program comprises a series of individual programming instructions. Program instructions that belong together technologically or functionally form a program module. A complete S.C. program typically contains several such programming -:modules. The modules can be input in an S.C. application-related programming language, e.g. as an instruction list, a contact plan, a logic plan, a function plan or a procedure language—or in a high-level language, e.g. in the "C" language. For the example shown in FIG. 1, it is assumed that program modules 31, 32, 34, 36 are input in an S.C. application-related language, and program modules 33, 35 are input in a high-level language. The program has a total of six program modules 31 to 36, that the user inputs in sequence.

For the input of the individual program modules 31 to 36, the operator activates the conversion device 13, hereinafter referred to as the S.C. converter, or the high-level language compiler 17, hereinafter referred to as a compiler, depending on whether the input will be carried out in an S.C. application-specific language or in a high-level language. Programs input in an S.C. application-related language are converted by the S.C. converter 13 in the usual manner, by simple, sentence by sentence translation of the programming instructions into application programs in machine code that can be executed directly by the S.C. operating system 14 and are stored in memory 15. The conversion of the program modules input in the high-level language into application programs in machine code that can be executed directly in the S.C. operating system 14 takes place with the help of information contained in memories 15, 16.

To make program modules easier to input in the high-level language, special commands are incorporated into it which emulate commands typical of an S.C.-related language that are not available in the high-level language. For example, the command "U E0.0" ("and input 0.0") that is typical in S.C. is emulated in the high-level language C by "if (BE(0, 0))"; the S.C. command "=A0.1" ("or output 0.1") is emulated by "{B.A.(0,1)=1;}". In C, the line "SPS_BA (2)" emulates the S.C.-typical "BA PB2" ("Module call, program module 2"). In this process, "S.P.S._" forms a prefix that precedes the command borrowed from the S.C. language. In the high-level language C used as a basis, the address specifications 0,0, and 0,1 used in the command examples above have no direct meaning. They are only generated in connection with associated program sequences stored in macro memory 15. Under consideration of the command examples given above in connection with the high-level language C, for example, address programming sequences are found in macro memory 15, which assign actual S.C. addresses, e.g. 0.0, to addresses used in the high-level language, e.g. 0,0. Likewise, when using high-level language C in macro memory 15, for example, the functions of Boolean algebra are implemented by program sequences stored there. A program sequence represents, for example, the connection between the S.C.-typical command of Boolean algebra "u" ("and") and the same command in the syntax emulating the high-level language, e.g. "u E1.1" ("and input 1.1") <=> "if ( . . . (1,1))".

In addition to directly executable commands like Boolean algebra commands or addresses, the S.C.-related programming language contains commands that implement SPC-specific functionalities and are not executed until the program processing. Examples of such commands include the "timer," the "count," the program end or the "module call" or "call" command. Corresponding commands are usually not provided in the syntax of the high-level language, e.g., in C. Therefore, they are implemented by operating program modules that can be executed directly by the S.C., which are stored in library memory 40 as library modules 41 to 44. For each library module there is also stored in the library mapping memory 16 a reference to library memory 40, which assigns a library module 41 to 44 to each command listed in the high level language that emulates an S.C.-typical command. For example, the library map memory 16 assigns the library module 41 "Call" to the command "BA" ("module call") listed in the high-level language that is not available in its syntax.

After being input completely, modules 33, 35 input in high-level language are transferred by compiler 17 into application program modules 53, 55 in machine code that can be executed directly by the S.C. operating system 14; the compiler 17 accesses the program sequences stored in macro memory 15 and the library references stored in the library mapping memory 16. If the compiler 17 recognizes an S.C.-specific special command that does not belong in the high-level language syntax in the program module 33, 35 to be compiled, as long as it is a directly executable command, it searches for an associated program sequence in macro memory 15 and incorporates it directly into the program module to be compiled. If it is a case of a functionality that is not carried out until the program is executed, for example the command "module call," compiler 17 decides, with the help of the library mapping memory 16, on a reference to library memory 40 and incorporates it in the executable program. Under consideration of the contents of macro memory 15 and library mapping memory 16, program modules input in high-level language are thus converted into executable application program modules. They are stored in memory 50 according to their position in the sequence of the S.C. program.

After the program modules 31 to 36 are converted into executable application program modules 51 to 56, the S.C. program developed in memory 50 is put into operation. The start-up is supported by the display processing device 18, which displays the program sequence resulting from the S.C. program in a monitor operating mode on screen 20. The underlying program instruction with program address, the signal status of the operands involved, the resulting logic results and the current states of time and counter functions are advantageously displayed.

FIG. 2 shows a typical screen set-up divided into three columns. In the left column, the program instructions are shown line by line; in the example of FIG. 2, the instruction "and bit timer 1," is displayed in the top line, the instruction "and bit flag 0.0," in the next line, the instruction "memory bit output 1.0" in the next line, and the instruction "and not bit timer 1" in the fourth line. The center column shows the logic results that go with the program instructions, the addressed bit being given on the left, the logic result in the center and the output bit on the right in each case. In the example of FIG. 2, the addressed bit in the first program instruction shown has the value 0, as does the logic result. For the second program instruction line, the same image results, the third program instruction line leads to a logic result and an output bit with the value 0, the fourth program instruction line supplies the value 0 for the addressed bit, and the value 1 as the logic result. In the right screen column, selected operands are represented, in the example—the content of a register and the status of a counter function T.

During the start-up of program modules 53, 55, resulting from modules 33, 35 that were input in a high-level language, there are additional representation options. The display processing device 18 uses information that was stored in start-up memory 19 by compiler 17 during compiling of the high-level language program modules. In addition to the monitor options that exist for the regular S.C. programs, especially with high-level language program modules 53, 55, a dynamic display of data can take place, in particular of S.C. operands or a one-time display of such data. Both S.C. and CPU registers can be displayed. Both individual values and the contents of entire fields, e.g. high-level language and S.C. variables, can be displayed. During compiling in compiler 17, errors that may occur are shown on screen 20, e.g., in a separate window.

FIG. 3 shows a typical screen set-up during the start-up of a program module 53, 55 input in high-level language. It is divided horizontally into two areas; in the upper area program variables selected by the user can be shown. In the example of FIG. 3, in the first line the bit structure of the word found in the flag 0.B is reproduced, in the second line the bit structure of the word forming input 0.B and in the third line the value of a timer. The values displayed either change dynamically or, optionally, are retained during the start-up of the program module. In the lower section of the screen, the program instructions of the module to be started up are reproduced. For example in FIG. 3 a program line is displayed, which if input 1.0 has the value 0, sets each of outputs 0.0 and 0.1 to the value 0.

As long as an S.C. program to be executed includes highlevel language modules 53, 55, before entering into the monitor operating mode, display processing device 18 continuously ensures process security. If, for example, an interrupt point is planned in a high-level language program module, it prompts the operator in an automatically triggered dialog by way of screen 20, to set all outputs to a secure status when it comes to an interrupt point.

What is claimed is:

1. A device for programming a stored program controller, comprising:

an operating system for executing an application program, wherein the application program is present in a machine code;

a first memory for storing the application program;

an input device for inputting a plurality of program instructions, wherein the plurality of program instructions are input in at least one of a stored program controller application-related programming language and a high-level language;

a conversion device for converting the plurality of program instructions input in the stored program controller application-related programming language into a first plurality of application program instructions, wherein the first plurality of application program instructions can be executed directly by the operating system and form at least a portion of the application program;

a second memory for storing a plurality of program sequences, wherein each one of the plurality of program sequences is assigned to at least one special program instruction incorporated into the high-level language, and wherein the each one of the plurality of program sequences implements a stored controller-specific command contained in the at least one special program instruction; and an automatic programming section for interpreting the plurality of program instructions input in the high-level language into a second plurality of application program instructions using the plurality of program sequences stored in the second memory, wherein the second plurality of application program instructions can be executed directly by the operating system.

2. The device according to claim 1, wherein the at least one special program instruction incorporated into the high-level language emulates a form and a content of a command in the controller application-related programming language.

3. The device according to claim 1, wherein the second memory includes a library memory for storing a plurality of program modules, wherein each one of the plurality of program modules assigns at least one application program sequence for implementing a controller-specific function specified by the at least one special program instruction, wherein the controller-specific function can be executed directly by the operating system during an execution of the application program to the at least one special program instruction incorporated into the high-level language.

4. The device according to claim 3, wherein the second memory further includes a library mapping memory for storing at least one reference to the each one of the plurality of program modules, and wherein the automatic programming section uses the at least one reference when interpreting the at least one special program instruction and includes the at least one reference in the second plurality of application program instructions.

5. The device according to claim 1, wherein the second memory includes a macro memory for storing the plurality of program sequences, wherein the each one of the plurality of program sequences is assigned to the at least one special program instruction, wherein the each one of the plurality of program sequences implements the controller-specific command contained in the at least one special program instruction, and wherein the automatic program section generates the second plurality of application program instructions when interpreting the at least one special program instruction.

6. The device according to claim 1, wherein the automatic programming section generates information to support a start-up during the interpretting of the plurality of program instructions input in the high-level language into the plurality of application program instructions forming the application program, and wherein the automatic program section writes the application program into a start-up memory.

7. The device according to claim 1, further comprising:

a start-up memory for storing information during a start-up of a program module input in the high-level language;

a display processing device for accessing information stored in the start-up memory; and a screen for dynamically displaying the information stored in the start-up memory accessed by the display processing device.

8. The device according to claim 7, wherein the display processing device performs at least one of a set of functions during the start-up of the program module input in the high-level language, and wherein the set of functions includes at least one of setting interrupt points, displaying program modules stored in the second memory, displaying individual steps, and displaying high-level language variables.

* * * * *